US012717834B2

(12) United States Patent
Arora et al.

(10) Patent No.: US 12,717,834 B2
(45) Date of Patent: Aug. 25, 2026

(54) SYSTEMS AND METHODS FOR GENERATIVE AI-ENHANCED LOCALIZED SMALL LANGUAGE MODEL DATA PROCESSING

(71) Applicant: BANK OF AMERICA CORPORATION, Charlotte, NC (US)

(72) Inventors: Saurabh Arora, Gurugram (IN); Sandeep Kumar Chauhan, Hyderabad (IN); Amit Kumar Kolli, Hyderabad (CN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 19/024,660

(22) Filed: Jan. 16, 2025

(65) Prior Publication Data

US 2026/0203334 A1 Jul. 16, 2026

(51) Int. Cl.

*G06F 16/00* (2019.01)
*G06F 16/2455* (2019.01)

(Continued)

(52) U.S. Cl.

CPC ...... *G06F 16/345* (2019.01); *G06F 16/24556* (2019.01); *G06F 16/9535* (2019.01);

(Continued)

(58) Field of Classification Search

CPC .... G06F 16/345; G06F 16/93; G06F 16/9538; G06F 16/24556; G06F 16/9535;

(Continued)

(56) References Cited

U.S. PATENT DOCUMENTS

| | | | |
|---|---|---|---|
| 7,363,212 B2 * | 4/2008 | Erhart | G06F 40/58 704/E15.044 |
| 8,145,472 B2 * | 3/2012 | Shore | G06F 40/47 704/4 |

(Continued)

FOREIGN PATENT DOCUMENTS

| | | |
|---|---|---|
| CN | 110765996 A | 2/2020 |
| EP | 784275 A1 * | 7/1997 |

(Continued)

OTHER PUBLICATIONS

Yunxiang Zhang et al., "Small Language Models Need Strong Verifiers to Self-Correct Reasoning", arXiv:2404.17140v2 [cs.CL] Jun. 6, 2024, pp. 1-17.*

(Continued)

*Primary Examiner* — Srirama Channavajjala
(74) *Attorney, Agent, or Firm* — Moore & Van Allen PLLC; Vincent J. Dowling

(57) ABSTRACT

Systems, computer program products, and methods are described herein for generative AI-enhanced localized small language model data processing. Embodiments of the present disclosure are configured to receive a plurality of small language models, where each small language model is configured to process a file type of a plurality of file types, receive a datafile including one or more data entries, where each data entry has a data type of one or more data types, classify the datafile as being a file type, ingest the datafile in a small language model, where the small language model is configured to process the file type of the datafile, generate a data summarization of the one or more data entries, validate the data summarization via one or more additional small language models configured to process other file types of the plurality of file types, and output the validated data summarization.

15 Claims, 11 Drawing Sheets

600

RECEIVE, VIA A NETWORK INTERFACE, A PLURALITY OF SMALL LANGUAGE MODELS, WHERE EACH SMALL LANGUAGE MODEL OF THE PLURALITY OF SMALL LANGUAGE MODELS IS CONFIGURED TO PROCESS A FILE TYPE OF A PLURALITY OF FILE TYPES
602

RECEIVE A DATAFILE INCLUDING ONE OR MORE DATA ENTRIES, WHERE EACH DATA ENTRY OF THE ONE OR MORE DATA ENTRIES HAS A DATA TYPE OF ONE OR MORE DATA TYPES
604

CLASSIFY THE DATAFILE AS BEING A FILE TYPE OF THE PLURALITY OF FILE TYPES
606

INGEST, BASED ON CLASSIFYING THE DATAFILE AS BEING THE FILE TYPE, THE DATAFILE IN A SMALL LANGUAGE MODEL OF THE PLURALITY OF SMALL LANGUAGE MODELS, WHERE THE SMALL LANGUAGE MODEL IS CONFIGURED TO PROCESS THE FILE TYPE OF THE DATAFILE
608

GENERATE, VIA THE SMALL LANGUAGE MODEL, A DATA SUMMARIZATION OF THE ONE OR MORE DATA ENTRIES
610

VALIDATE THE DATA SUMMARIZATION VIA ONE OR MORE ADDITIONAL SMALL LANGUAGE MODELS OF THE PLURALITY OF SMALL LANGUAGE MODELS CONFIGURED TO PROCESS OTHER FILE TYPES OF THE PLURALITY OF FILE TYPES, WHERE THE OTHER FILE TYPES ARE DIFFERENT FROM THE FILE TYPE OF THE DATAFILE
612

OUTPUT THE VALIDATED DATA SUMMARIZATION VIA THE NETWORK INTERFACE
614

(51) Int. Cl.

| | |
|---|---|
| ***G06F 16/34*** | (2019.01) |
| ***G06F 16/9535*** | (2019.01) |
| ***G06F 16/9538*** | (2019.01) |
| ***G06F 40/00*** | (2020.01) |
| ***G06F 40/117*** | (2020.01) |
| ***G06F 40/284*** | (2020.01) |
| ***G06N 20/00*** | (2019.01) |
| ***G06V 30/12*** | (2022.01) |
| ***G06V 30/413*** | (2022.01) |

(52) U.S. Cl.
CPC ........ *G06F 16/9538* (2019.01); *G06F 40/117* (2020.01); *G06F 40/284* (2020.01); *G06N 20/00* (2019.01); *G06V 30/133* (2022.01); *G06V 30/413* (2022.01)

(58) Field of Classification Search
CPC .. G06F 16/2428; G06F 40/284; G06F 40/117; G06F 40/10; G06F 40/211; G06F 40/14; G06V 30/413; G06V 30/133; G06N 7/01; G06N 20/00; G06N 20/10; G06N 3/044
See application file for complete search history.

(56) References Cited

U.S. PATENT DOCUMENTS

| | | | | |
|---|---|---|---|---|
| 8,150,677 | B2 * | 4/2012 | Menezes | G06F 40/45 704/277 |
| 8,626,486 | B2 | 1/2014 | Och et al. | |
| 9,626,960 | B2 * | 4/2017 | Vozila | G10L 15/18 |
| 10,755,054 | B1 * | 8/2020 | Waibel | G06F 40/263 |
| 10,832,657 | B2 | 11/2020 | Suzuki et al. | |
| 10,885,285 | B2 | 1/2021 | Och et al. | |
| 11,443,193 | B2 | 9/2022 | Li et al. | |
| 11,755,883 | B2 * | 9/2023 | Dai | G06V 10/82 706/27 |
| 11,989,527 | B2 | 5/2024 | Tunstall-Pedoe et al. | |
| 12,130,848 | B1 | 10/2024 | Koneru et al. | |
| 12,380,287 | B2 | 8/2025 | Gardner et al. | |
| 12,493,615 | B2 | 12/2025 | Lazarev et al. | |
| 2009/0150364 | A1 * | 6/2009 | Melander | G06F 40/143 |
| 2012/0271617 | A1 * | 10/2012 | Nakajima | G10L 15/183 704/2 |
| 2014/0039879 | A1 | 2/2014 | Berman | |
| 2014/0250375 | A1 * | 9/2014 | Malik | G06F 16/345 715/254 |
| 2019/0332658 | A1 * | 10/2019 | Heckel | G06N 3/048 |
| 2022/0246257 | A1 * | 8/2022 | Priestas | G16H 15/00 |
| 2024/0095463 | A1 | 3/2024 | Leary et al. | |
| 2024/0146734 | A1 | 5/2024 | Southgate et al. | |
| 2024/0256582 | A1 * | 8/2024 | Jain | G06F 16/3329 |
| 2024/0303466 | A1 | 9/2024 | Sharma et al. | |
| 2024/0370767 | A1 * | 11/2024 | Baruch | G06N 3/045 |
| 2024/0403428 | A1 | 12/2024 | Lal et al. | |
| 2024/0411994 | A1 | 12/2024 | Siracusano et al. | |
| 2024/0419657 | A1 * | 12/2024 | Kaushal | G06F 21/6227 |
| 2025/0078823 | A1 | 3/2025 | Fan et al. | |
| 2025/0165650 | A1 * | 5/2025 | Rahimov | G06F 21/6254 |
| 2025/0209085 | A1 * | 6/2025 | Rai | G06F 16/254 |
| 2025/0307538 | A1 * | 10/2025 | Sarin | G06F 40/20 |

FOREIGN PATENT DOCUMENTS

| | | | |
|---|---|---|---|
| EP | 3910492 | A2 * | 11/2021 |
| WO | WO201414095 | A1 * | 9/2014 |
| WO | WO2020205861 | A1 * | 10/2020 |

OTHER PUBLICATIONS

Matteo Magnini et al., "Open-sourcesmalllanguagemodelsforpersonalmedicalassistantchatbots", Intelligence-Based Medicine Available online Jan. 7, 2025,pp. 1-9.*

Xueming Yan et al., "Generative Large Language Models Explained [AI-explained]", IEEE Computational Intelligence Magazine (vol. 19, Issue: 4, Nov. 2024), pp. 45-46.*

* cited by examiner

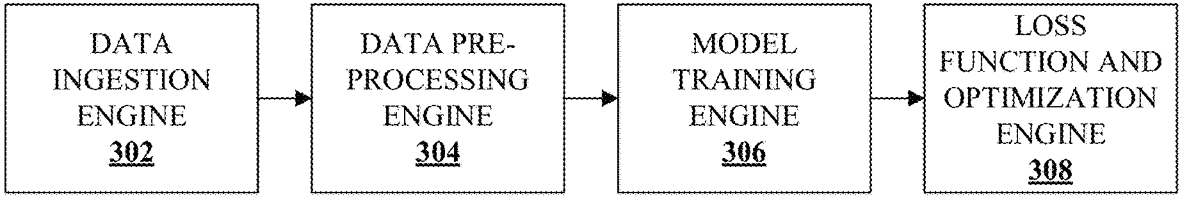
FIGURE 3

INGEST A DATA SUMMARIZATION IN ONE OR MORE ADDITIONAL SMALL LANGUAGE MODELS OF A PLURALITY OF SMALL LANGUAGE MODELS
702

GENERATE AN ACCURACY MEASUREMENT FOR THE DATA SUMMARIZATION VIA EACH SMALL LANGUAGE MODEL OF THE ONE OR MORE ADDITIONAL SMALL LANGUAGE MODELS TO GENERATE ACCURACY MEASUREMENTS
704

CALCULATE AN AVERAGE ACCURACY USING EACH ACCURACY MEASUREMENT OF THE GENERATED ACCURACY MEASUREMENTS
706

COMPARE THE AVERAGE ACCURACY AGAINST A THRESHOLD TO DETERMINE WHETHER THE DATA SUMMARIZATION IS VALID
708

FIGURE 7

DETERMINE, IF AN AVERAGE ACCURACY IS ABOVE A THRESHOLD, THAT A DATA SUMMARIZATION IS VALID
802

DETERMINE, IF AN AVERAGE ACCURACY IS BELOW A THRESHOLD, THAT A DATA SUMMARIZATION IS NOT VALID
902

GENERATE, VIA A SMALL LANGUAGE MODEL, A NEW DATA SUMMARIZATION
904

SYSTEMS AND METHODS FOR GENERATIVE AI-ENHANCED LOCALIZED SMALL LANGUAGE MODEL DATA PROCESSING

FIELD OF THE INVENTION

The present invention embraces a system for generative AI-enhanced localized small language model data processing.

BACKGROUND

Presently, a plurality of file types (e.g., checks, loans, account opening forms, mortgage forms, and/or the like) are read and processed by entity applications. Entity applications reading and processing the plurality of file types will extract data of one or more data types (e.g., PDF, PNG, handwritten, JPG, TXT, and/or the like) via data extraction methods (e.g., optical character recognition). Current data extraction methods suffer from inefficiencies in data extraction and data quality of extracted data. There is a need for data extraction methods with increased efficiency and improved data quality and/or data correctness.

Applicant has identified a number of deficiencies and problems associated with efficiency, resource usage, and accuracy in data extraction and data summarizations of datafiles. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for generative AI-enhanced localized small language model (SLM) data processing may include a network interface configured to communicate via a communication network, at least one non-transitory storage device including computer program code stored thereon, and at least one processing device operably coupled to the network interface, and the at least one non-transitory storage device. In some embodiments, the computer program code may include computer instructions configured to cause the processing device to receive, via the network interface, a plurality of small language models, where each small language model of the plurality of small language models is configured to process a file type of a plurality of file types and receive a datafile including one or more data entries, where each data entry of the one or more data entries has a data type of one or more data types. Additionally, or alternatively, the computer program code may include computer instructions configured to cause the processing device to classify the datafile as being a file type of the plurality of file types and ingest, based on classifying the datafile as being the file type, the datafile in a small language model of the plurality of small language models, where the small language model is configured to process the file type of the datafile. In some embodiments, the computer program code may include computer instructions configured to cause the processing device to generate, via the small language model, a data summarization of the one or more data entries and validate the data summarization via one or more additional small language models of the plurality of small language models configured to process other file types of the plurality of file types, where the other file types are different from the file type of the datafile. Additionally, or alternatively, the computer program code may include computer instructions configured to cause the processing device to output the validated data summarization via the network interface.

In some embodiments, the at least one non-transitory storage device may include computer-executable program code that, when executed by the at least one processing device, causes the at least one processing device to, when validating the data summarization of the datafile, ingest the data summarization in the one or more additional small language models of the plurality of small language models, generate an accuracy measurement for the data summarization via each small language model of the one or more additional small language models to generate accuracy measurements, calculate an average accuracy using each accuracy measurement of the generated accuracy measurements, and compare the average accuracy against a threshold to determine whether the data summarization is valid.

In some embodiments, the at least one non-transitory storage device may include computer-executable program code that, when executed by the at least one processing device, causes the at least one processing device to, when validating the data summarization of the datafile, determine, if the average accuracy is above the threshold, that the data summarization is valid. Additionally, or alternatively, the at least one non-transitory storage device may include computer-executable program code that, when executed by the at least one processing device, causes the at least one processing device to, when validating the data summarization of the datafile, determine, if the average accuracy is below the threshold, that the data summarization is not valid, and generate, via the small language model, a new data summarization.

In some embodiments, the plurality of small language models may be local versions of a global plurality of small language models stored on a system connected via the network interface. Further, each small language model of the global plurality of small language models may be trained on a database associated with a file type of each small language model. Additionally, or alternatively, each database may include a plurality of data elements required for a file type associated with the database.

In some embodiments, the small language model may be configured to output one or more metadata elements associated with the one or more data entries of the datafile. Additionally, or alternatively, the small language model may be configured to output an adjusted datafile, where the adjusted datafile may include adjusted image resolutions, text contrasts, size adjustments, scaling adjustments, and clarity enhancements of the datafile.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
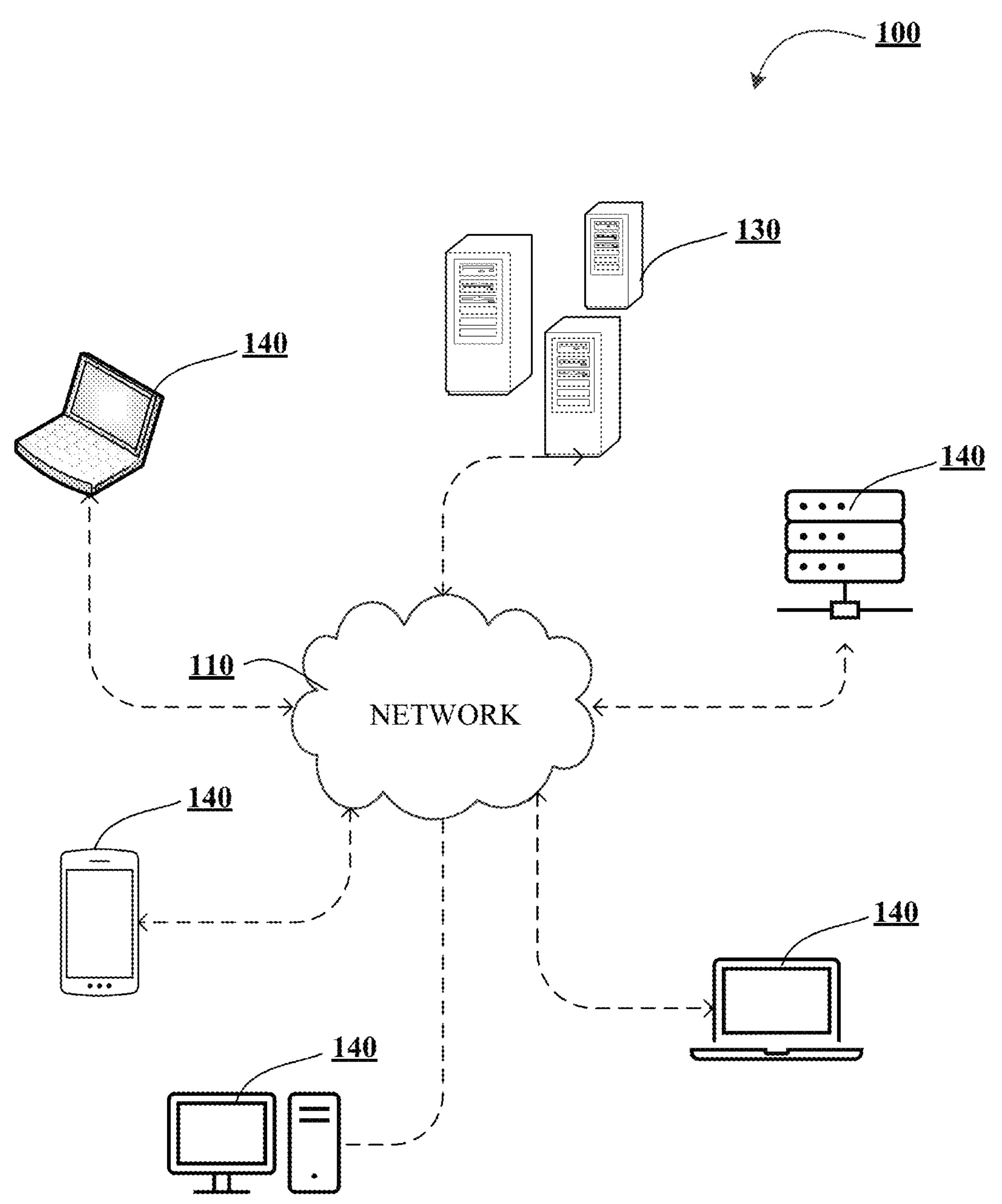
Figure 1B:
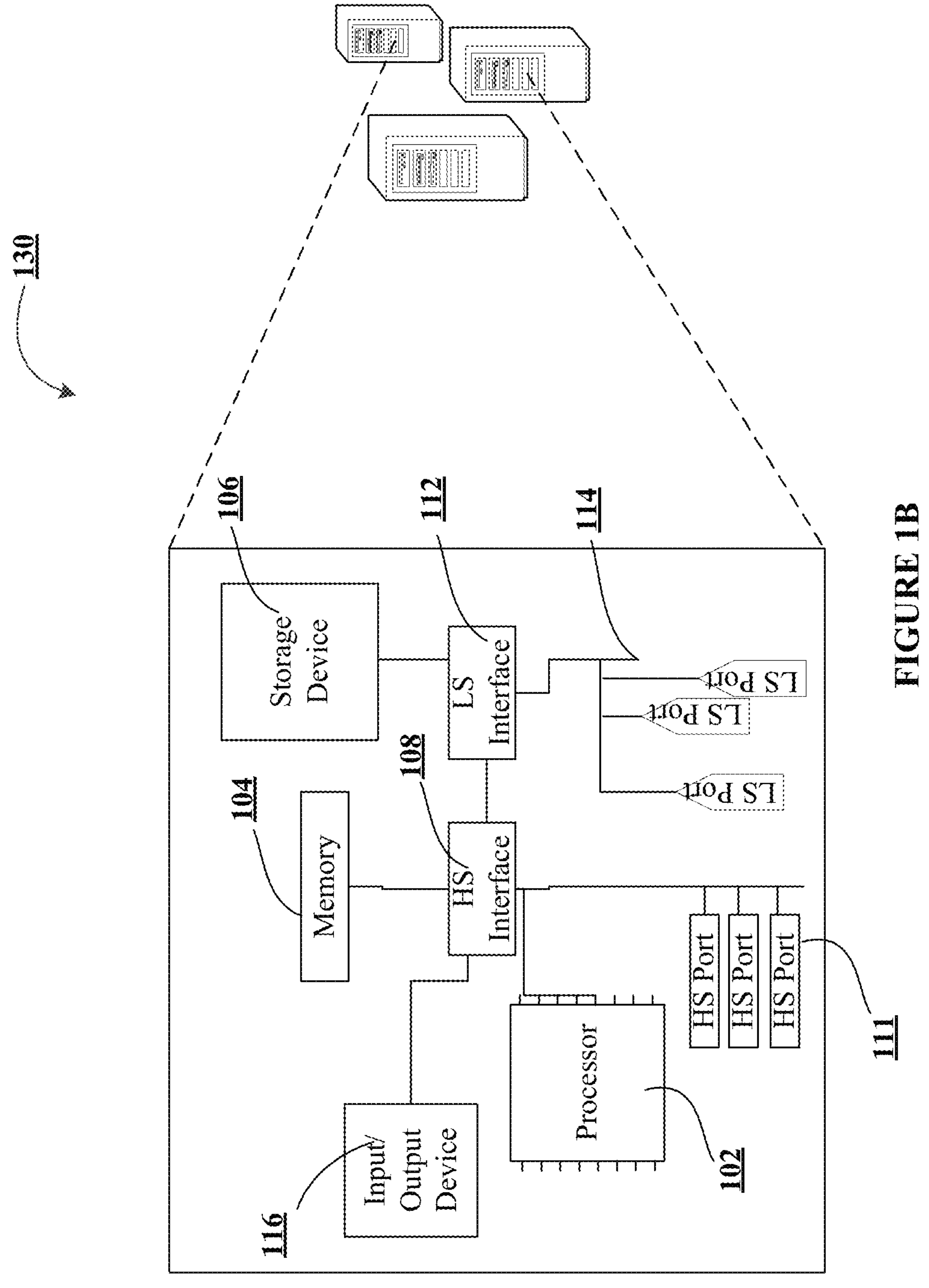
Figure 1C:
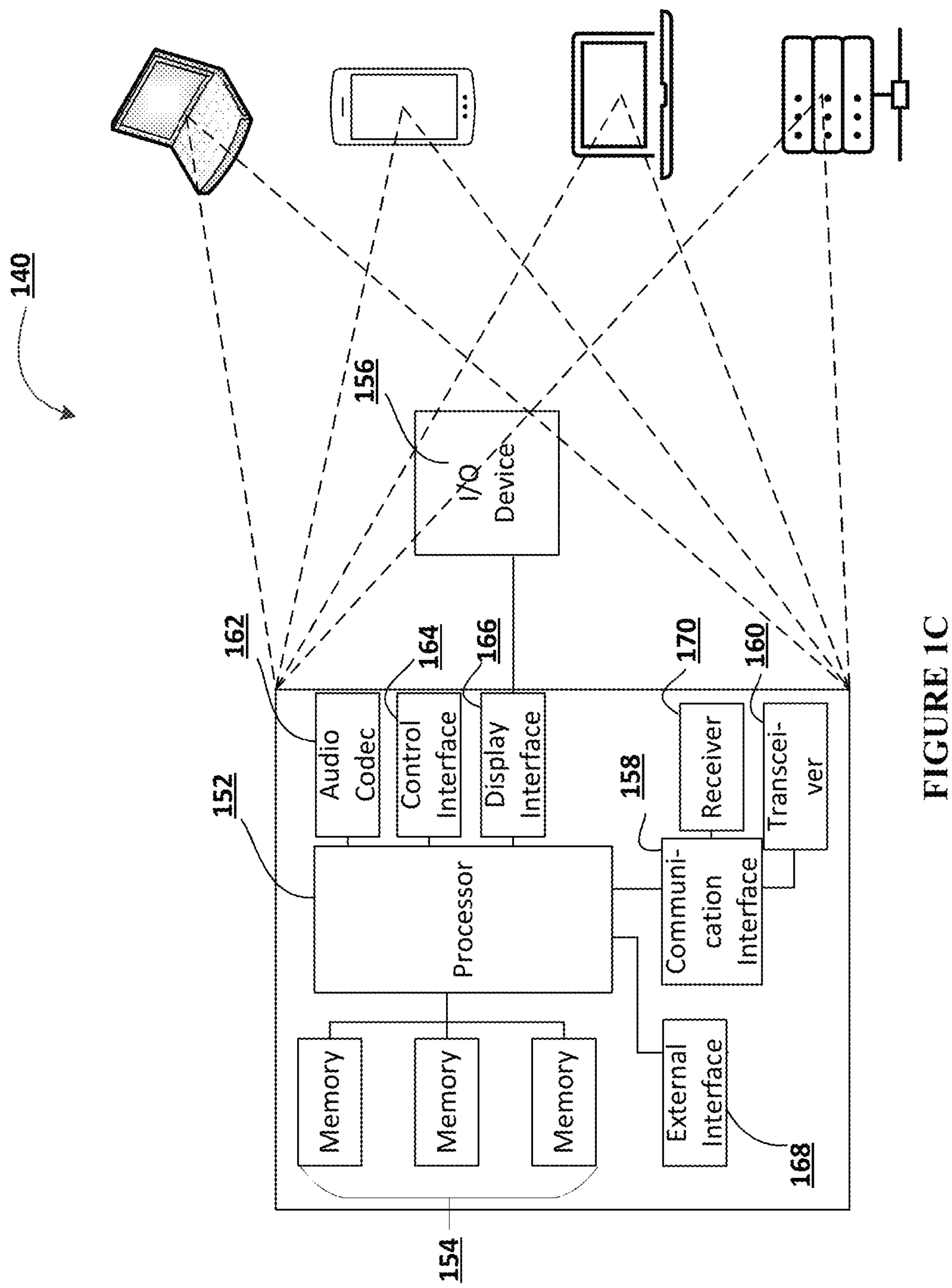
Figure 2:
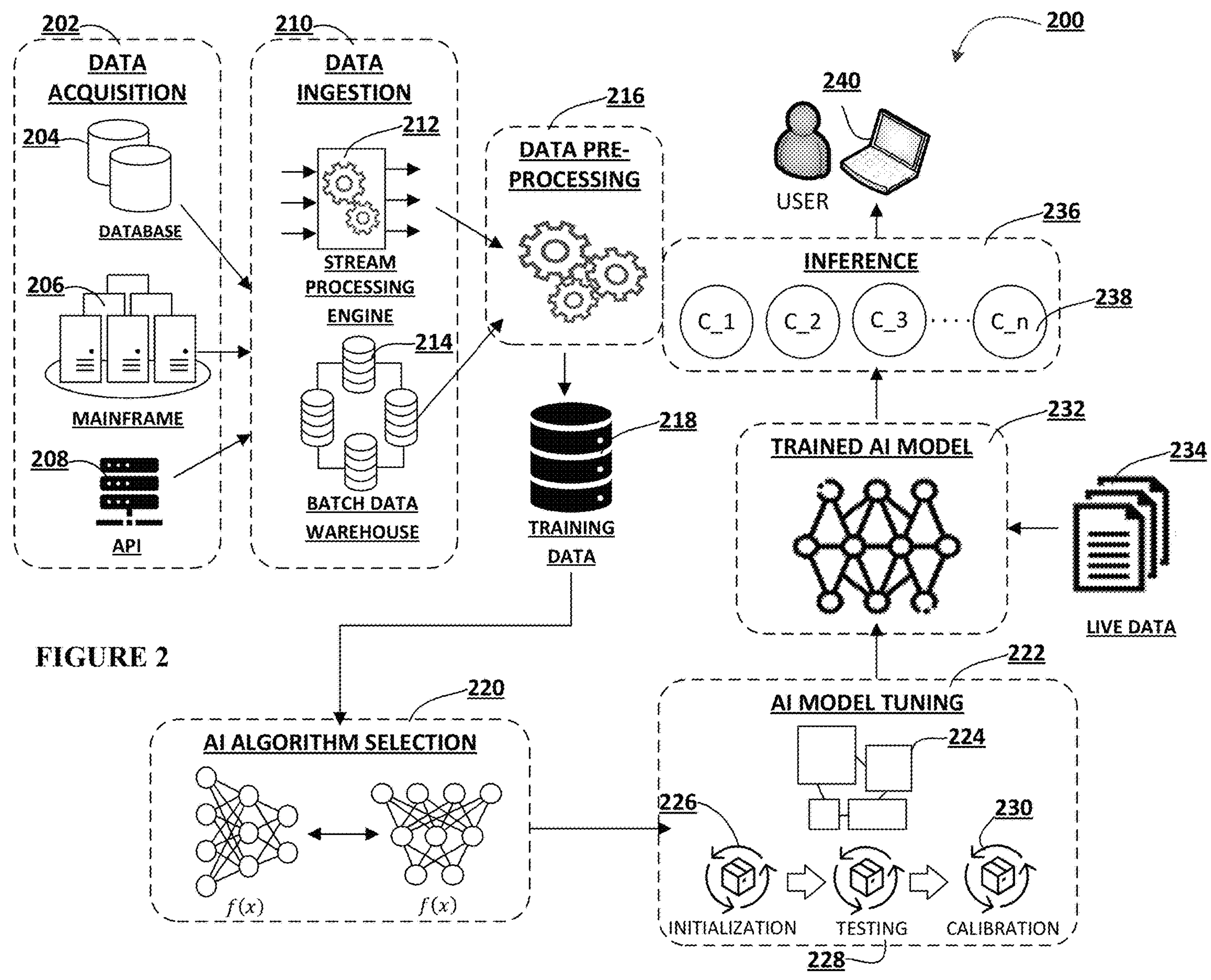
Figure 4:
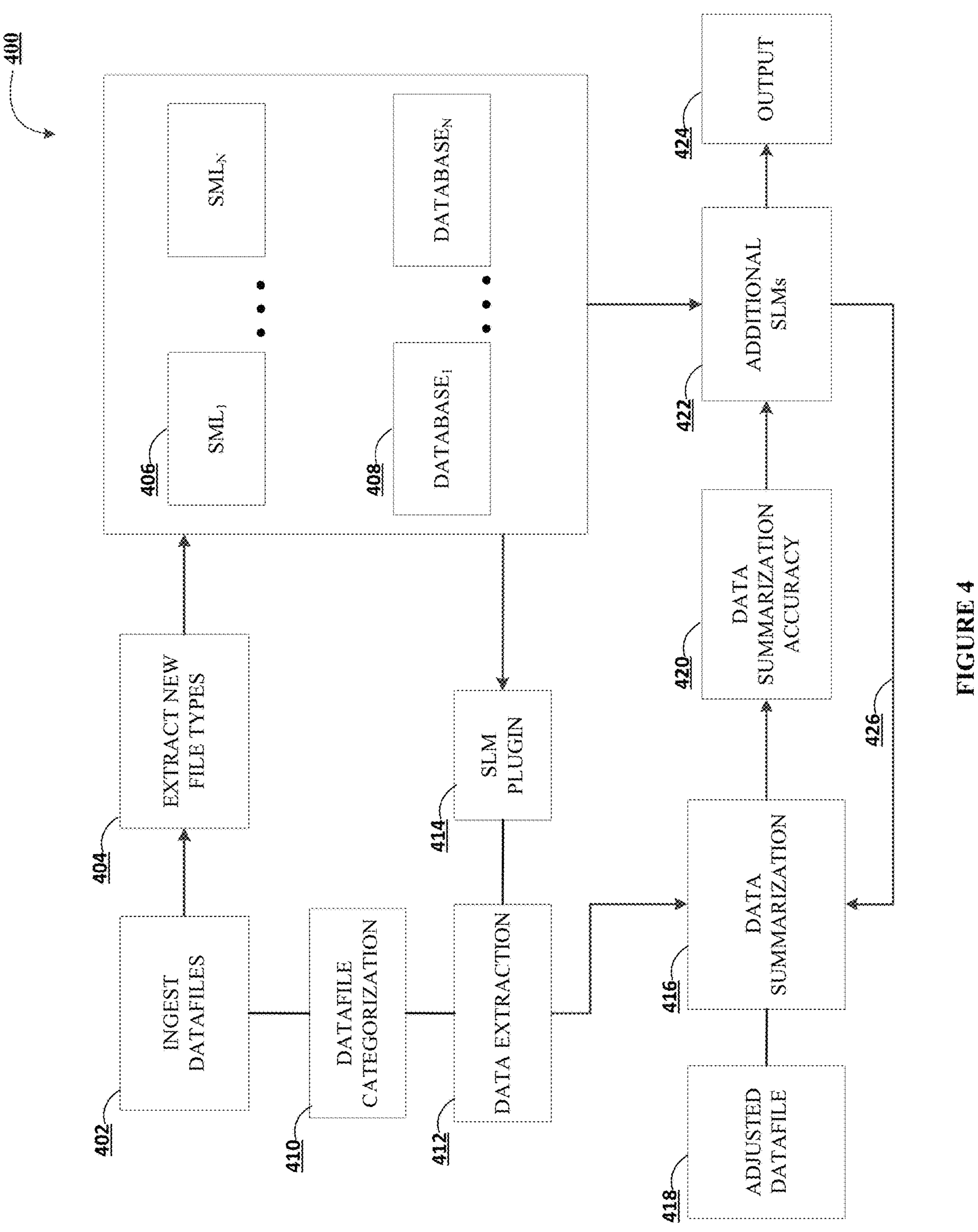
Figure 5:
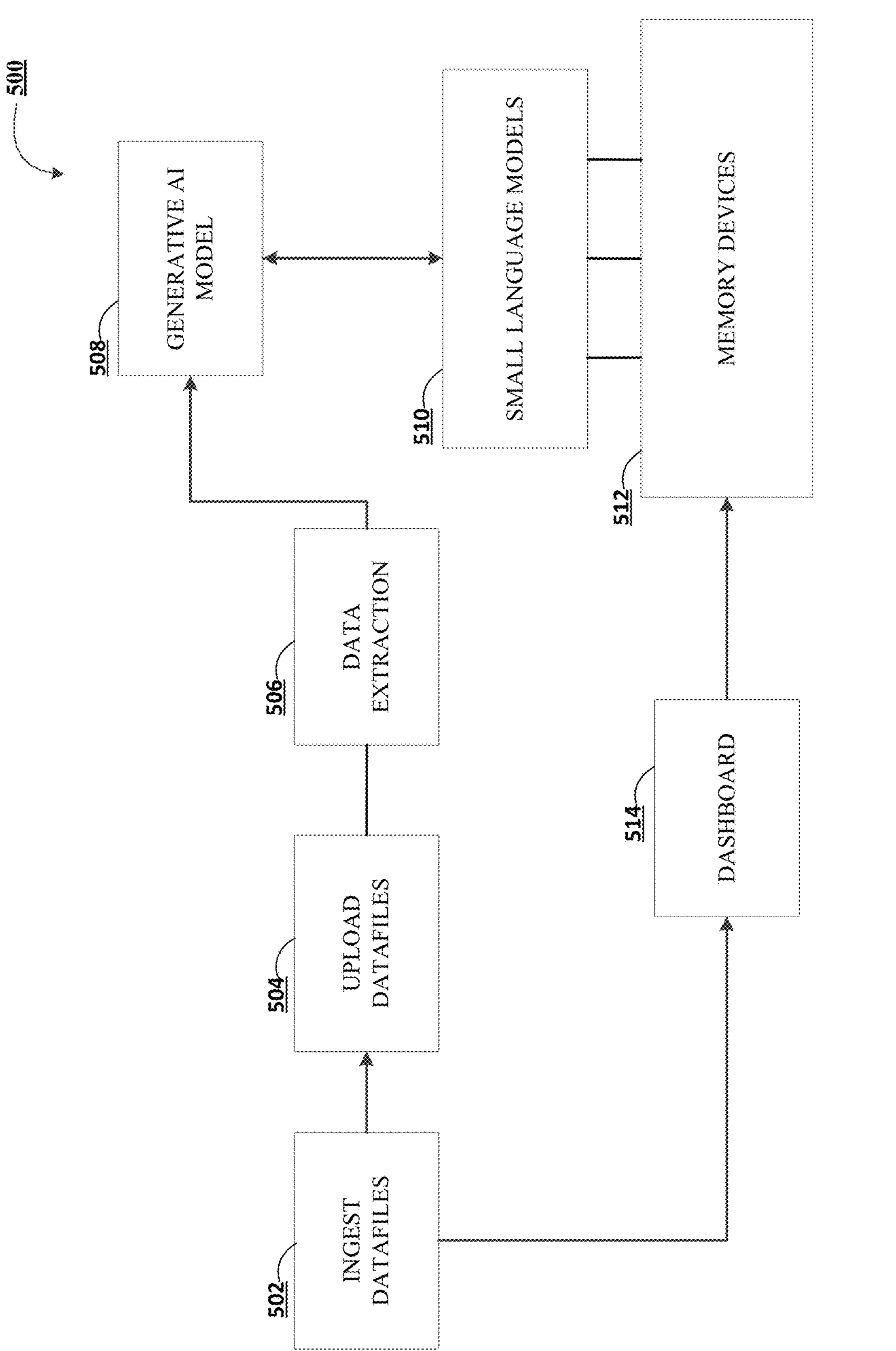
Figure 6:
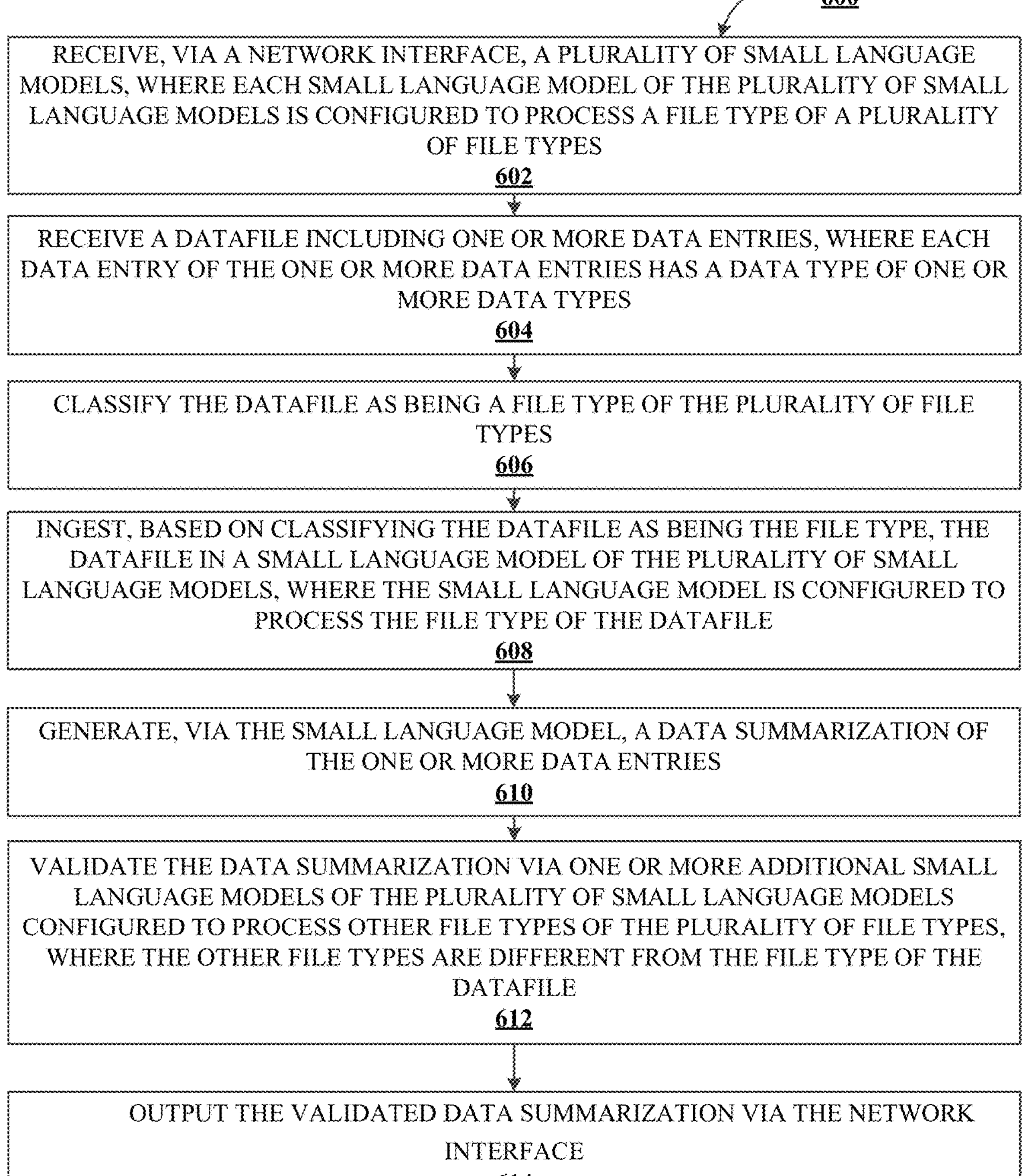
Figure 8:
Figure 9:

Having thus described embodiments of the invention in general terms, reference will now be made the accompanying drawings, wherein:

FIGS. 1A-1C illustrates technical components of an exemplary distributed computing environment for generative AI-enhanced localized small language model data processing, in accordance with an embodiment of the disclosure;

FIG. 2 illustrates an exemplary artificial intelligence (AI) engine subsystem architecture, in accordance with an embodiment of the disclosure;

FIG. 3 illustrates an exemplary generative AI subsystem, in accordance with an embodiment of the disclosure;

FIG. 4 illustrates a flowchart for generative AI-enhanced localized small language model data processing, in accordance with an embodiment of the disclosure;

FIG. 5 illustrates another flowchart for generative AI-enhanced localized small language model data processing, in accordance with an embodiment of the disclosure;

FIG. 6 illustrates a process flow for generative AI-enhanced localized small language model data processing, in accordance with an embodiment of the disclosure;

FIG. 7 illustrates another process flow for generative AI-enhanced localized small language model data processing, in accordance with an embodiment of the disclosure;

FIG. 8 illustrates another process flow for generative AI-enhanced localized small language model data processing, in accordance with an embodiment of the disclosure; and FIG. 9 illustrates another process flow for generative AI-enhanced localized small language model data processing, in accordance with an embodiment of the disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, and/or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, and/or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and/or the like.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository-a storage location where one or more resources are organized, stored and retrieved electronically using a computing device.

As used herein, a "resource transfer," "resource distribution," or "resource allocation" may refer to any transaction, activities, or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event", or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e., paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

The present disclosure may include a system, computer program, and/or method for generative AI-enhanced localized small language model data processing. Presently, a plurality of file types (e.g., checks, loans, loan applications, loan forms, images, user identification forms, user identification documents, account opening forms, mortgage forms, and/or the like) are read and processed by entity applications. Entity applications reading and processing the plurality of file types will extract data of one or more data types (e.g., PDF, PNG, handwritten, JPG, TXT, and/or the like) via data extraction methods (e.g., optical character recognition). Current data extraction methods suffer from inefficiencies in data extraction and data quality of extracted data. There is a need for data extraction methods with increased efficiency and improved data quality and/or data correctness.

Accordingly, the invention may include a system, computer program, and method for generative AI-enhanced localized small language model data processing. Embodiments of the present disclosure may be configured to receive a datafile, where the datafile may include one or more datatypes (e.g., PDF, PNG, handwritten, JPG, TXT, and/or the like) and classify the datafile as a category of a plurality of categories (e.g., specific document types including loans, checks, account opening forms, and/or the like). Embodiments of the present disclosure may be configured to ingest the datafile in a small language model of a plurality of small language models, where the small language model of the plurality of small language models is chosen based on the datafile category, and output, from the small language model, a data summarization of the datafile. For example, a plurality of small language models, each directed to a specific document type, may be installed on a local machine. A datafile may be passed to the system, where the datafile is determined (e.g., via optical character recognition, metadata associated with the datafile, and/or the like) to be a check. A small language model directed to analyzing checks may receive and ingest the datafile. The small language model may interpret data of the datafile and/or generate metadata associated with the datafile. Further, the analysis of the small language model may be cross validated by one or more additional small language models of the plurality of small language models, where the one or more additional small language models may be directed to document types with common patterns. If the cross-validation accuracy is above a threshold, the data summarization of the datafile is output. If the cross-validation accuracy is below a threshold, the small language model may be configured to reanalyze the datafile.

What is more, the present invention provides a technical solution to a technical problem. As described herein, the technical problem includes improving efficiency, resource usage, and accuracy in generating data summarizations of datafiles. The technical solution presented herein allows for a system to receive a plurality of small language models, receive a datafile including one or more data entries, classify the datafile as being a file type, ingest the datafile in a small language model configured to process the file type, generate a data summarization of the one or more data entries, validate the data summarization via one or more additional small language models, and output the validated data summarization. In particular, generative AI-enhanced localized small language model data processing is an improvement over existing solutions to reading and/or processing datafile of different file types and/or including one or more data types, (i) with fewer steps to achieve the solution, thus reducing the amount of computing resources, such as processing resources, storage resources, network resources, and/or the like, that are being used (e.g., by analyzing datafiles locally, resources spent transferring datafiles and data summarizations between networked devices is decreased and/or eliminated), (ii) providing a more accurate solution to the problem, thus reducing the number of resources required to remedy any errors made due to a less accurate solution (e.g., by using a plurality of small language models each of which are configured to process a specific file type, data quality of extracted data is increased thus reducing resources spent reanalyzing datafiles), (iii) removing manual input and waste from the implementation of the solution, thus improving speed and efficiency of the process and conserving computing resources (e.g., by leveraging small language models, manual review of datafiles and/or data summaries is eliminated), and (iv) determining an optimal amount of resources that need to be used to implement the solution, thus reducing network traffic and load on existing computing resources (e.g., by using a plurality of small language models over a large language model, datafiles may be processed by a small language model configured for a file type common to a datafile and a small language model thus reducing computer resources spent over operating a large language model). Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment 100 for generative AI-enhanced localized small language model data processing, in accordance with an embodiment of the invention. As shown in FIG. 1A, the distributed computing environment 100 contemplated herein may include a system 130 (i.e., a generative AI-enhanced localized small language model data processing system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 106. Each of the components 102, 104, 106, 108, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary artificial intelligence (AI) engine subsystem architecture 200, in accordance with an embodiment of the disclosure. In some embodiments, the AI engine subsystem 200 may be included in a system (e.g., similar to the system 130 shown and described herein with respect to FIGS. 1A-1C). Additionally, or alternatively, the AI engine subsystem 200 may be a subsystem of another system (e.g., similar to the system 130 shown and described herein with respect to FIGS. 1A-1C) that is in communication with a system for generative AI-enhanced localized small language model data processing (e.g., via a network similar to the network 110 as shown and described herein with respect to FIGS. 1A-1C). Further, the AI engine subsystem 200 may be a subsystem of another system (e.g., similar to the system 130 shown and described herein with respect to FIGS. 1A-1C) that is in communication with (e.g., via a network similar to the network 110 as shown and described herein with respect to FIGS. 1A-1C) a generative AI subsystem (e.g., similar to the generative AI subsystem 300 as shown and described herein with respect to FIG. 3). The artificial intelligence subsystem 200 may include a data acquisition engine 202, data ingestion engine 210, data pre-processing engine 216, AI tuning engine 222, and inference engine 236.

The data acquisition engine 202 may identify various internal and/or external data sources to generate, test, and/or integrate new features for training the artificial intelligence engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 210, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence, the quality of data and the useful information that can be derived therefrom directly affects the ability of the artificial intelligence engine 224 to learn. The data pre-processing engine 216 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm being used, this training data 218 may require further enrichment. For example, in supervised learning, the training data is enriched using one or more meaningful and informative labels to provide context so an artificial intelligence engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI tuning engine 222 may be used to train an artificial intelligence engine 224 using the training data 218 to make predictions or decisions without explicitly being programmed to do so. The artificial intelligence engine 224 represents what was learned by the selected artificial intelligence algorithm 220 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence engine type. Each of these types of artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence engine, the AI tuning engine 222 may repeatedly execute cycles of experimentation 226, testing 228, and tuning 230 to optimize the performance of the artificial intelligence algorithm 220 and refine the results in preparation for deployment of those results for consumption or decision making. To this end, the AI tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 218. A fully trained artificial intelligence engine 232 is one whose hyperparameters are tuned and engine accuracy maximized.

The trained artificial intelligence engine 232, similar to any other software application output, can be persisted to storage, file, memory, or application, or looped back into the processing component to be reprocessed. More often, the trained artificial intelligence engine 232 is deployed into an existing production environment to make practical business decisions based on live data 234. To this end, the artificial intelligence subsystem 200 uses the inference engine 236 to make such decisions. The type of decision-making may depend upon the type of artificial intelligence algorithm used. For example, artificial intelligence engines trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence engines trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 240. In still other cases, artificial intelligence engines that perform regression techniques may use live data 234 to predict or forecast continuous outcomes.

It will be understood that the embodiment of the artificial intelligence subsystem 200 illustrated in FIG. 2 is exemplary and that other embodiments may vary. As another example, in some embodiments, the artificial intelligence subsystem 200 may include more, fewer, or different components.

FIG. 3 illustrates an exemplary generative AI subsystem 300, in accordance with an embodiment of the invention. In some embodiments, the generative AI subsystem 300 may be included in a system (e.g., similar to the system 130 shown and described herein with respect to FIGS. 1A-1C). Additionally, or alternatively, the generative AI subsystem 300 may be a subsystem of another system (e.g., similar to the system 130 shown and described herein with respect to FIGS. 1A-1C) that is in communication with a system for generative AI-enhanced localized small language model data processing (e.g., via a network similar to the network 110 as shown and described herein with respect to FIGS. 1A-1C). Further, the generative AI subsystem 300 may be a subsystem of another system (e.g., similar to the system 130 shown and described herein with respect to FIGS. 1A-1C) that is in communication with (e.g., via a network similar to the network 110 as shown and described herein with respect to FIGS. 1A-1C) an AI engine subsystem (e.g., similar to the AI engine subsystem 200 as shown and described herein with respect to FIG. 2).

The generative AI subsystem 300 may include a data ingestion engine 302, a data pre-processing engine 304, a model training engine 306, and a loss function and optimization engine 308. It should be understood that the generative AI subsystem 300 is merely an example, and other embodiments may include more, fewer, or different components depending on the specific requirements and implementations of the system. For instance, additional engines for data validation, feature selection, or distributed computing may be integrated into the subsystem, or certain components described herein may be consolidated or omitted based on system performance objectives. Therefore, the generative AI subsystem 300 should not be considered limiting and may be adapted to various configurations within the scope of the invention.

The data ingestion engine 302 may identify various internal and/or external data sources to generate, test, and/or integrate new features for training the generative AI model. These internal and/or external data sources (e.g., text corpora, web-based text data, document repositories, or decentralized text storage system) may be initial locations where the data originates or where physical information is first digitized. In addition to conventional data sources, the data ingestion engine 302 may support decentralized storage systems, such as blockchain-based data sources, and privacy-preserving methods such as differential privacy. The data ingestion engine 302 may identify the location of the data and describe connection characteristics for access and retrieval of data. In some embodiments, data is transported from each data source using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like.

Depending on the nature of the data, the data ingestion engine 302 may move the data to a destination for storage or further analysis. Typically, the data may be in varying formats as they come from different sources, including RDBMS, other types of databases, S3 buckets, CSVs, and/or from streams. For a large language model ("LLM"), text data may originate from sources such as web scrapes, social media, large public text datasets, and/or the like. Since the data comes from different places, it needs to be cleansed and transformed so that it can be analyzed together with data from other sources. The data may be ingested in real-time, using stream processing, in batches using a batch data warehouse, or a combination of both. Stream processing may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse collects and transfers data in batches according to scheduled intervals, trigger events, and/or any other logical ordering.

In machine learning, the quality of data and the useful information that can be derived therefrom directly affects the ability of the machine learning model to learn. The data pre-processing engine 304 may implement advanced integration and processing steps needed to prepare the data for machine learning execution, including tokenization, text normalization, and removal of irrelevant elements like HTML tags in web-based data, especially for LLM training. This may include modules to perform any upfront, data transformation to consolidate the data into alternate forms by changing the value, structure, or format of the data using generalization, normalization, attribute selection, and aggregation, text-specific transformations such as stemming and lemmatization, data cleaning by filling missing values, smoothing the noisy data, resolving the inconsistency, and removing outliers, and/or any other encoding steps as needed. In some embodiments, the data pre-processing engine 304 may perform real-time pre-processing at the edge via edge computing devices, allowing for the transformation and reduction of data prior to transmission to centralized locations, thereby reducing latency and conserving network bandwidth.

In addition to improving the quality of the data, the data pre-processing engine 304 may transform categorical data into numerical formats that are suitable for machine learning algorithms. In this regard, the data pre-processing engine 304 may use techniques such as one-hot encoding or label encoding depending on the nature of the categorical variables and the intended use of the data.

In some embodiments, the data pre-processing engine 304 may also include dimensionality reduction techniques, where the number of input features is reduced while retaining the most relevant information. In this regard, the data pre-processing engine 304 may include methods such as Principal Component Analysis (PCA) or apply feature selection algorithms to remove redundant or irrelevant features, thereby reducing the computational complexity of the model training phase. Feature selection may be particularly beneficial in datasets with a high number of features, ensuring that the generative AI models do not overfit to noise or irrelevant details. The pre-processed data output from the data pre-processing engine 304 may then be fed into the model training engine 306.

The model training engine 306 may be responsible for training the generative AI models using the pre-processed data from the data pre-processing engine 304. The model training engine 306 may implement various machine learning algorithms, including but not limited to Generative Adversarial Networks (GANs), Variational Autoencoders (VAEs), transformers, diffusion models, or other specialized architectures depending on the specific requirements of the system. These models may be used in a broad range of applications, such as LLMs for text generation, image generation models, video synthesis models, audio generation models, and/or the like. The model training engine 306 may optimize these models by continuously adjusting their internal parameters based on the patterns and relationships identified within the data.

In some embodiments, the model training engine 306 may include a training data handler, which manages the partitioning of the pre-processed data into training, validation, and testing datasets. The training data is used to update the model's parameters, while the validation and testing datasets are reserved to evaluate the model's performance during and after training. The model training engine 306 may support various data-handling strategies, such as cross-validation or random shuffling, to ensure that the model generalizes well and is not overfitting to the training data.

In embodiments involving large language models, the model training engine 306 may utilize transformer-based architectures, such as the Transformer, BERT, GPT, or the like. Transformer models rely on mechanisms like self-attention to capture dependencies between words in a sequence, regardless of their distance from one another. The self-attention mechanism allows the model to weigh the importance of different words in a sentence and establish complex relationships important for understanding context. During training, the model may process vast amounts of text data and learn to predict the next word or token in a sequence based on the input context. This training process allows LLMs to generate coherent text, complete sentences, translate languages, or answer questions based on learned patterns from the data.

The transformer-based LLMs may be trained using autoregressive (e.g., GPT) or masked-language modeling techniques (e.g., BERT). In autoregressive models, the training process may include predicting the next word in a sequence by progressively revealing more context to the model. The model iteratively improves its predictions based on its performance during prior iterations. Masked-language modeling involves masking certain words in a sentence and training the model to correctly predict the masked words based on surrounding context. Both approaches enable LLMs to capture intricate patterns in human language, improving their ability to handle tasks such as summarization, translation, and text generation. Loss functions like cross-entropy loss may be used to optimize the model's performance by comparing predicted tokens with the actual tokens in the dataset to guide the model to minimize prediction errors during training.

In embodiments involving image generation models, the model training engine 306 may utilize transformer-based architectures, such as Vision Transformers (ViTs) or generative adversarial networks (GANs). Vision Transformers rely on self-attention mechanisms to process images as sequences of patches rather than whole images, allowing the model to capture spatial dependencies and patterns across the image. During training, the model may be exposed to large datasets containing diverse image types to learn features like textures, edges, and shapes. The model may then generate or reconstruct images by interpreting these patterns and applying learned spatial relationships. GAN-based models may also be used, where a generator network creates images, and a determinator network evaluates their realism, enabling the model to improve through adversarial training.

Image generation models may employ various training techniques, such as pixel-wise reconstruction or adversarial training, depending on the architecture. Pixel-wise reconstruction methods involve learning to reconstruct an image from its corrupted or downscaled version, optimizing the model to minimize the difference between the predicted and actual pixels (e.g., using mean squared error as the loss function). Adversarial training, often used with GANs, involves iteratively improving the generator network to produce images that are increasingly indistinguishable from real images, based on feedback from the determinator network. These approaches allow the model to capture complex visual features, enabling applications such as image synthesis, enhancement, and style transfer.

For video generation models, the model training engine 306 may employ transformer-based architectures like Video Transformers or GAN-based models specifically designed for handling temporal sequences. Video Transformers use self-attention mechanisms to model dependencies not only between pixels within a single frame but also across frames, allowing them to understand temporal relationships and motion patterns in videos. The model may be trained on large video datasets, enabling it to learn and reproduce dynamic changes and interactions between objects over time. GAN-based video models may incorporate spatiotemporal networks to evaluate the realism of generated video sequences, optimizing the model to produce continuous and coherent frames.

Video generation models may utilize spatial-temporal modeling techniques or adversarial training for generating realistic motion and video sequences. Spatial-temporal modeling involves learning the spatial features within each frame while simultaneously capturing the temporal dependencies between frames, optimizing the model's ability to predict future frames or complete missing sequences. Loss functions like mean squared error or perceptual loss may be applied to reduce discrepancies between predicted and actual frames. Adversarial training, on the other hand, may involve a generator creating video sequences and a determinator evaluating their realism, encouraging the generator to improve by minimizing the discrepancy identified by the determinator. These techniques may enable video generation models to create coherent and realistic sequences, useful in applications such as video synthesis and animation.

In audio generation models, the model training engine 306 may utilize architectures such as Audio Transformers or recurrent neural networks (RNNs) like WaveNet, designed to handle sequential and waveform data. Audio Transformers leverage attention mechanisms to capture relationships between segments of audio, allowing them to model temporal dependencies and predict the next audio sample based on previous context. During training, the model may process large audio datasets containing diverse sound patterns to learn representations of different audio features, such as frequency, amplitude, and harmonics. This training enables the model to generate coherent audio sequences, including speech, music, or ambient sounds, by synthesizing these learned patterns.

Audio generation models may be trained using sequence modeling techniques or autoregressive methods, depending on the architecture. Sequence modeling techniques involve processing and predicting sequences of audio samples, optimizing the model to capture and reproduce temporal dependencies in sound. Autoregressive methods, such as those employed in WaveNet, focus on predicting each audio sample based on prior samples, progressively refining the generated audio sequence over multiple iterations. Loss functions like mean absolute error or cross-entropy loss may be used to minimize the error between predicted and actual audio samples, guiding the model to improve its accuracy. These approaches allow audio generation models to create continuous and realistic audio outputs, applicable in areas such as speech synthesis, music generation, and sound effect creation.

The reconstruction loss ensures that the difference between the original input and the reconstructed output is minimized, guiding the decoder to generate outputs that closely resemble the input data. The second component, KL divergence loss, regularizes the latent space by ensuring that the distribution of latent variables conforms to a predefined probabilistic distribution, often a Gaussian distribution. This constraint encourages the model to learn a well-organized and smooth latent space, allowing for meaningful sampling from this space during inference. By combining these loss functions, the VAE can learn a latent space that not only captures the underlying patterns in the data but also allows for the generation of novel outputs by sampling new points from this space. During the inference phase, the trained model can sample random points from the latent space to generate new, previously unseen data instances.

In training generative AI models, the model training engine 306 may implement optimization techniques such as gradient clipping, learning rate scheduling, and mixed-precision training. Gradient clipping may be used to stabilize the training process, especially in transformer-based models, by capping the magnitude of gradients to prevent them from becoming excessively large. Learning rate scheduling may involve gradually increasing the learning rate during initial training phases (warm-up) and then decaying it as training progresses to fine-tune the model's parameters more effectively. Mixed-precision training, which leverages lower-precision (e.g., float16) arithmetic while retaining higher precision (e.g., float33) for specific calculations, may be used to accelerate training and reduce memory consumption, enabling the model to scale efficiently even when trained on large datasets.

In some embodiments, the model training engine 306 may implement early stopping mechanisms to prevent overfitting. Early stopping monitors the generative AI model's performance on the validation dataset, halting the training process if the performance does not improve after a specified number of iterations. This ensures that the generative AI model does not continue training on noise or irrelevant patterns, which could degrade its performance on unseen data. The model training engine 306 may also support distributed training across multiple computing nodes, allowing the system to scale its computational resources as needed. Distributed training may involve splitting the generative AI model and data across multiple machines or GPUs, where each node processes a portion of the data and updates the model in parallel. This is particularly useful for large datasets or models that require significant computational power, such as deep generative models. The model training engine 306 may synchronize the updates across the nodes using techniques like synchronous or asynchronous gradient descent.

Once the generative AI model is trained, the model training engine 306 may save the final trained generative AI model in a persistent storage location for future use. In specific embodiments, metadata such as the number of epochs, the final loss values, and values of learned parameters may be logged for model versioning and/or retraining at a later stage. In some embodiments, the model training engine 306 may also implement transfer learning, where a pre-trained model is fine-tuned on a smaller, domain-specific dataset. This may reduce the amount of time and data required to train a new model, especially in cases where the available data is limited or highly specialized. The model training engine 306 may adjust the parameters of the pre-trained model to better align with the new dataset, while preserving the learned features from the original training.

In embodiments involving LLMs, new output is generated by sampling from the model's probability distribution of tokens, conditioned on the context provided as input. Transformer-based architectures, such as GPT, use an auto-regressive approach where the model predicts the next token in a sequence one step at a time, using previously generated tokens as input for subsequent predictions. The process starts with a prompt or an initial sequence of words, and the model iteratively generates new tokens, forming coherent sentences or paragraphs based on the learned context and language patterns. For masked-language modeling (e.g., BERT), new output may be generated by filling in masked parts of the input sequence, allowing the model to complete sentences or generate variations of the provided text. The generated output can be controlled by adjusting parameters such as heat, which influences the randomness of the token sampling, enabling the generation of diverse or deterministic responses.

In image generation models, such as those using ViTs or GANs, new output is generated by sampling from the learned distribution in the model's latent space. For GANs, the generator network creates an image by transforming random noise vectors into structured image outputs through a series of layers that learn visual features like shapes, textures, and colors. The generated image is then refined through adversarial feedback from the determinator network, which assesses the realism of the generated output. For transformer-based image models, the process may involve reconstructing images by assembling patches based on the learned dependencies between them. Input conditions, such as prompts describing desired features or specific noise vectors, guide the generation process, allowing for the creation of customized images or variations of existing visual styles. These models may also generate images based on style transfer techniques or predefined templates, synthesizing images that align with the characteristics present in the training data.

Video generation models utilize spatiotemporal dependencies to synthesize new video sequences based on the patterns learned during training. In transformer-based architectures, the model may generate video frames sequentially, predicting the next frame based on the input frames and the temporal context established by prior frames. GAN-based models, specifically designed for video synthesis, may sample noise vectors, or use a sequence of frames as input, transforming these into continuous and temporally coherent video outputs through the generator network. The determinator evaluates the temporal consistency and realism of the output, ensuring the generated video mimics the motion dynamics and object interactions present in real-world video data. Such models may also use attention mechanisms to focus on critical elements within each frame and their evolution across time, facilitating realistic scene transitions and motion patterns. The generation process may include user-defined input such as initial frames, motion descriptions, or specific video attributes, providing control over the output.

Audio generation models, including Audio Transformers or autoregressive architectures like WaveNet, generate new audio sequences by predicting audio samples based on learned dependencies in sequential sound data. For autoregressive models, the generation process involves producing each audio sample one at a time, conditioned on previously generated samples, allowing the model to build complex audio patterns such as speech, music, or ambient sounds. The model starts with an initial segment or a random seed and uses its learned parameters to predict and synthesize subsequent samples, constructing a continuous audio waveform. Audio Transformers, on the other hand, may use attention mechanisms to identify important temporal segments within the input audio and synthesize new output based on these learned patterns. The user can control the type of audio generated by providing parameters such as pitch, tempo, or initial sound clips, enabling the model to generate outputs tailored to specific use cases like speech synthesis, music composition, or environmental sound generation.

In some embodiments, generative AI models may also integrate multiple modalities, enabling cross-modal generation where output in one modality influences or conditions the generation in another. For example, a video generation model may use text descriptions as input, synthesizing video content that aligns with the specified narrative or visual scene described. Similarly, image generation models may generate visual representations based on audio inputs, such as generating animations synchronized to musical rhythms or speech patterns. These cross-modal systems typically involve conditional GANs or multi-modal transformers, where the model processes input from one domain (e.g., text or audio) and learns to generate output in another domain (e.g., video or image) by aligning the patterns and dependencies between the different modalities. These models may allow users to generate complex, multimodal content based on combinations of inputs, such as using textual prompts to control the visual and auditory elements of a video.

It will be understood that the embodiment of the generative AI subsystem 300 illustrated in FIG. 3 is exemplary and that other embodiments may vary. The generative AI subsystem 300, as well as its constituent elements, may vary, and modifications or alternative configurations may be implemented without departing from the broader scope of the invention. For instance, different machine learning algorithms, data sources, optimization techniques, or training methodologies may be employed depending on system requirements, application domain, and available computational resources. Furthermore, features and functionalities described in one embodiment may be combined with those of another embodiment as needed, and vice versa.

FIG. 4 illustrates a flowchart 400 for generative AI-enhanced localized small language model data processing, in accordance with an embodiment of the disclosure. In some embodiments, a system (e.g., similar to one or more of the systems shown and described herein with respect to FIGS. 1A-1C) may perform one or more of the steps of flowchart 400. For example, a generative AI-enhanced localized small language model data processing system (e.g., similar to the system 130 shown and described herein with respect to FIG. 1A-1C) may perform the steps of flowchart 400. In some embodiments, an artificial intelligence engine (e.g., similar to the AI engine subsystem 200 as shown and described herein with respect to FIG. 2) may perform one or more of the steps of flowchart 400. Additionally, or alternatively, a generative artificial intelligence engine (e.g., similar to the generative AI subsystem 300 as shown and described herein with respect to FIG. 3) may perform one or more of the steps of flowchart 400.

In some embodiments, the flowchart 400 may begin by the step 402 of consuming one or more datafiles for analysis. The one or more datafiles may then be scanned for any file types not presently found in a memory device of a networked device (e.g., a remote server) as shown in step 404. Additionally, or alternatively, if a new file type is found, the file type may be transmitted to the networked device for long term storage. As shown in block 406, for each file type, new or known, a small language model configured to process and/or analyze an associated file type (e.g., similar to the process flow 600 as shown and described herein with respect to FIG. 6) may be generated such that a plurality of small language models may be created and stored on the networked device. Each small language model of the plurality of small language models may be configured to look for mandatory fields (e.g., data elements of a datafile of a file type that must be present in the datafile) and/or datafile attributes. In such embodiments, the plurality of small language models may execute faster and require less computational resources over present model configurations (e.g., one large language model) for a plurality of file types. Additionally, or alternatively, each small language model of the plurality of small language models may have an associated database and/or operation data storage for previous datafiles and/or example datafiles of a shared file type for training the model as shown in block 408. The associated databases may include key data elements for a file type that are required for that file type.

In some embodiments, the flowchart 400 may include the step 410 of categorizing and/or classifying the one or more datafiles. In such embodiments, the one or more datafiles may be first categorized by their file types. The one or more datafiles may be further categorized by data types included in each datafile. Additionally, or alternatively, the one or more datafiles may be categorized by their relevance to an entity associated with the one or more datafiles. Upon being categorized, a system (e.g., similar to the system 130 as shown and described herein with respect to FIGS. 1A-1C), as shown in step 412, may be configured to extract one or more data entries from a datafile of the one or more datafiles. Further, the system may receive, via a network interface, one or more small language models of the plurality of language models from the networked device such that the one or more small language models are stored and are operating locally to the one or more datafiles as shown in step 414. In this way, a datafile of the one or more datafiles may have the one or more data entries extracted efficiently, and with minimal computer resources, by a small language model of the plurality of small language models with a shared file type.

In some embodiments, the flowchart 400 may include, upon extracting the one or more data entries, the step 416, where the one or more data entries are analyzed and/or summarized by the small language model (e.g., similar to the steps of the process flow 600 as shown and described herein with respect to FIG. 6). In such embodiments, a data summarization of key data entries of the one or more data entries of the datafile may be generated and/or metadata associated with the data summarization of the datafile may be generated. Additionally, or alternatively, the flowchart 400 may include the step 418, where an adjusted datafile is generated by the small language model. In such embodiments, the datafile may have one or more attributes that are below a required quality (e.g., image resolution, text contrast, clarity, size, scaling, legibility, and/or the like). The small language model may be configured to detect that the attributes are below a required quality, enhance them to a required level, and generate the adjusted datafile.

In some embodiments, the flowchart 400 may include the step 420, where the data summarization generated by the step 418 of the datafile is analyzed by one or more additional small language models for an accuracy of the data summarization. As shown in block 422, the one or more additional small language models selected to analyze the data summarization may include common pattern analysis rules, evaluation parameters, and/or document relevancy maps to the small language model associated with the data summarization. In such embodiments, each small language of the one or more additional small language models may be configured to generate an accuracy measurement of the data summarization, each of which may be averaged together to generate an average accuracy of the data summarization (e.g., similar to the steps of the process flow 700 as shown and described herein with respect to FIG. 7). In some embodiments, as shown in step 424 of the flowchart 400, the data summarization may be output if the data summarization is validated by the average accuracy of the data summarization being above a threshold (e.g., similar to the process flow 800 as shown and described herein with respect to FIG. 8). Additionally, or alternatively, as shown in step 426 of the flowchart 400, the data summarization may be determined to be not valid due to the average accuracy of the data summarization being below the threshold. In such embodiments, the small language model may be configured to generate a new data summarization of the datafile (e.g., similar the steps of the process flow 900 as shown and described herein with respect to FIG. 9).

The flowchart 400 may include additional embodiments, such as any single embodiment or any combination of embodiments described herein. Although FIG. 4 shows example blocks of the flowchart 400, in some embodiments, the flowchart 400 may include additional blocks, fewer blocks, different blocks, or differently arranged blocks than those depicted in FIG. 4. Additionally, or alternatively, two or more of the blocks of the flowchart 400 may be performed in parallel. In some embodiments, the steps of flowchart 400 may be performed for a plurality of users simultaneously and/or at different times.

FIG. 5 illustrates another flowchart 500 for generative AI-enhanced localized small language model data processing, in accordance with an embodiment of the invention. In some embodiments, a system (e.g., similar to one or more of the systems shown and described herein with respect to FIGS. 1A-1C) may perform one or more of the steps of flowchart 500. For example, a generative AI-enhanced localized small language model data processing system (e.g., similar to the system 130 shown and described herein with respect to FIG. 1A-1C) may perform the steps of flowchart 500. In some embodiments, an artificial intelligence engine (e.g., similar to the AI engine subsystem 200 as shown and described herein with respect to FIG. 2) may perform one or more of the steps of flowchart 500. Additionally, or alternatively, a generative artificial intelligence engine (e.g., similar to the generative AI subsystem 300 as shown and described herein with respect to FIG. 3) may perform one or more of the steps of flowchart 500.

In some embodiments, the flowchart 500 may include the step 502 of consuming one or more datafiles for analysis. The one or more datafiles may then be scanned for any file types not presently found in a memory device of a networked device (e.g., a remote server). Additionally, or alternatively, if a new file type is found, the file type may be transmitted to the networked device for long term storage. In some embodiments, the flowchart 500 may include the step 504 of uploading the one or more datafiles to the networked device for storage and/or analysis. Additionally, or alternatively, after upload, the one or more datafiles may each have one or more data entries extracted as shown in step 506. Further, the extracted one or more data entries of each of the one or more datafiles may be transmitted to a generative AI model (e.g., similar to the generative AI subsystem 300 as shown and described herein with respect to FIG. 3) for analysis as shown in step 508. In such embodiments, the generative AI model may be configured to generate data summarization of the one or more data entries for each of the one or more datafiles in real time. In some embodiments, as shown in block 510, the generative AI model may include a plurality of small language models each configured to analyze a specific file type of a datafile. In some embodiments, the flowchart 500 may include the step 512, where the extracted one or more data entries, the generated data summarization, and/or identified priority elements of the one or more data entries are stored in one or more memory devices. Additionally, or alternatively, the flowchart 500 may include the step 514 of providing a dashboard to a user and/or an entity. In such embodiments, the dashboard may be configured to provide data tailored to a chosen file type. Further, the dashboard may be configured to provide an interactive GUI to a user and/or an entity to provide search terms for one or more data entries. The dashboard may be configured to, in some embodiments, search the data in the one or more memory devices for the provided search terms and present, via the GUI, the results to the user and/or the entity. Additionally, or alternatively, the dashboard may be configured to provide effective search modules, summarized views, datafile relevancy mappings, historical datafile searches, searches of extracted one or more data entries, searches of generated data summarizations, and/or the like.

The flowchart 500 may include additional embodiments, such as any single embodiment or any combination of embodiments described herein. Although FIG. 5 shows example blocks of the flowchart 500, in some embodiments, the flowchart 500 may include additional blocks, fewer blocks, different blocks, or differently arranged blocks than those depicted in FIG. 5. Additionally, or alternatively, two or more of the blocks of the flowchart 500 may be performed in parallel.

FIG. 6 illustrates a process flow 600 for generative AI-enhanced localized small language model data processing, in accordance with an embodiment of the invention. In some embodiments, a system (e.g., similar to one or more of the systems shown and described herein with respect to FIGS. 1A-1C) may perform one or more of the steps of process flow 600. For example, a generative AI-enhanced localized small language model data processing system (e.g., similar to the system 130 shown and described herein with respect to FIG. 1A-1C) may perform the steps of process flow 600. In some embodiments, an artificial intelligence engine (e.g., similar to the AI engine subsystem 200 as shown and described herein with respect to FIG. 2) may perform one or more of the steps of process flow 600. Additionally, or alternatively, a generative artificial intelligence engine (e.g., similar to the generative AI subsystem 300 as shown and described herein with respect to FIG. 3) may perform one or more of the steps of process flow 600.

In some embodiments, and as shown in block 602, the process flow 600 may include the step of receiving, via a network interface, a plurality of small language models, where each small language model of the plurality of small language models is configured to process a file type of a plurality of file types. In some embodiments, the plurality of small language models may be a plurality of AI models (e.g., one or more of which may be similar to the AI engine subsystem 200 as shown and described herein with respect to FIG. 2) configured for natural language processing and the like. In such embodiments, each small language model of the plurality of small language models may be configured to use fewer parameters and/or computational requirements than other AI models (e.g., large language models). The small language models may, in some embodiments, be efficient, requiring less memory, processing power, and/or energy compared to other AI models, making the plurality of small language models ideal for generative AI-enhanced localized small language model data processing.

In some embodiments, an entity application may be configured to receive datafiles, each of which may be a different file type. For example, an entity application may receive checks, loans, account opening forms, mortgages, and/or other form types. In such embodiments, the plurality of small language models may have a small language model dedicated to a specific file type. By way of example, the plurality of small language models may have a small language model configured to analyze loan documents and/or files, another small language model configured to analyze checks, another small language model configured to analyze account opening forms, another small language model configured to analyze mortgage documents and/or files, and/or a plurality of additional small language models for additional file types.

Additionally, or alternatively, the plurality of small language models may be received, via the network interface, from a networked system storing a global plurality of small language models such that the plurality of small language models are local versions of the global plurality of small language models. In such embodiments, the plurality of small language models may operate locally on datafiles so as to reduce computation time. Further, each small language model of the global plurality of small language models may be trained on a database associated with a file type of each small language model. For example, a small language model configured to analyze checks may have an associated database including example and/or sample checks that the small language model is trained on prior to deployment. Similarly, small language models configured to analyze other file types may have an associated database including examples of other file types that they are trained on prior to deployment.

In some embodiments, and as shown in block 604, the process flow 600 may include the step of receiving a datafile including one or more data entries, where each data entry of the one or more data entries has a data type of one or more data types. In such embodiments, the datafile may be received from a networked user device, from a local, operably coupled memory device (e.g., the memory 104 as shown and described herein with respect to FIGS. 1A-1C), from a networked entity device, and/or the like. Additionally, or alternatively, the datafile may be any one of the file types as described herein. Further, the one or more data types may include images (e.g., PNG, JPG, and/or the like), text (e.g., TXT, handwritten, and/or the like), and/or any combination of images and text (e.g., PDF and/or the like).

In some embodiments, and as shown in block 606, the process flow 600 may include the step of classifying the datafile as being a file type of the plurality of file types. In such embodiments, a processing device (e.g., the processor 102 as shown and described herein with respect to FIGS. 1A-1C) may include computer code configured to identify the file type of the datafile. Additionally, or alternatively, the datafile may include associated metadata that may identify the file type of the datafile. For example, a user may submit a datafile and identify the datafile as a check (e.g., through an interactive environment in a GUI) such that the datafile includes metadata denoting the datafile as a check file type. A processing device and/or other components may extract the metadata and classify the datafile as a check. In other embodiments, datafiles may be scanned for data elements or combinations of data elements indicative of the data type associated with a datafile.

In some embodiments, and as shown in block 608, the process flow 600 may include the step of ingesting, based on classifying the datafile as being the file type, the datafile in a small language model of the plurality of small language models, where the small language model is configured to process the file type of the datafile. In such embodiments, a small language model configured to process datafiles of the file type of the datafile may be identified and selected from the plurality of small language models for use in analyzing the datafile. Further, the small language model may be stored in a memory device common to both the small language model and the datafile.

In some embodiments, and as shown in block 610, the process flow 600 may include the step of generating, via the small language model, a data summarization of the one or more data entries. In such embodiments, the small language model may generate the data summarization of the one or more data entries using any of and/or any combination of AI steps and/or methods as described herein. For example, a small language model may ingest a datafile of a shared file type by reading and processing one or more data entries of the datafile. This may include parsing structured data like CSV or JSON and/or processing unstructured text. Further, the small language model may extract relevant data from the one or more data entries, identify relevant patterns and/or trends, and/or contextualize the data to understand significance of the data. In some embodiments, the small language model may use extractive or abstractive summarization techniques to condense the data into a data summarization. Further, extractive summarization may involve directly selecting important sections. Additionally, or alternatively, abstractive summarization may paraphrase and shorten the data. In some embodiments, the small language model may generate a readable output that may include the data summarization, where the data may be refined to focus on the most important points, such as key findings, trends, and/or statistics.

In some embodiments, and as shown in block 612, the process flow 600 may include the step of validating the data summarization via one or more additional small language models of the plurality of small language models configured to process other file types of the plurality of file types, where the other file types are different from the file type of the datafile. In such embodiments, the one or more additional small language models may be each trained via data stored on databases associated with each file type for each of the one or more additional small language models. As will be understood by one of ordinary skill in the art in view of the present disclosure, AI algorithms, methods, and/or the like used by the small language model for a specific file type may be similar to AI algorithms, methods, and/or the like used by the one or more additional small language models. Further, the patterns, data elements, and/or the like the small language models is trained to find, extract, and/or analyze may be similar to the patterns, data elements, and/or the like the one or more additional small language models are trained to find, extract, and/or analyze. In this way, the data summarization generated by the small language model may be ingested and analyzed by the one or more small language model to verify the data summarization. In some embodiments, the step of block 612 may be performed by some of and/or all of the steps of the process flow 700 as shown and described herein with respect to FIG. 7.

In some embodiments, and as shown in block 614, the process flow 600 may include the step of outputting the validated data summarization via the network interface. The small language model may output to a user, an entity, another system, and/or the like as plain text, often structured based on the specific requirements such as bullet points, paragraph format, and/or as a file for storage in memory.

The process flow 600 may include additional embodiments, such as any single embodiment or any combination of embodiments described herein. Although FIG. 6 shows example blocks of the process flow 600, in some embodiments, the process flow 600 may include additional blocks, fewer blocks, different blocks, or differently arranged blocks than those depicted in FIG. 6. Additionally, or alternatively, two or more of the blocks of the process flow 600 may be performed in parallel.

FIG. 7 illustrates another process flow 700 for generative AI-enhanced localized small language model data processing, in accordance with an embodiment of the invention. In some embodiments, a system (e.g., similar to one or more of the systems shown and described herein with respect to FIGS. 1A-1C) may perform one or more of the steps of process flow 700. For example, a generative AI-enhanced localized small language model data processing system (e.g., similar to the system 130 shown and described herein with respect to FIG. 1A-1C) may perform the steps of process flow 700. In some embodiments, an artificial intelligence engine (e.g., similar to the AI engine subsystem 200 as shown and described herein with respect to FIG. 2) may perform one or more of the steps of process flow 700. Additionally, or alternatively, a generative artificial intelligence engine (e.g., similar to the generative AI subsystem 300 as shown and described herein with respect to FIG. 3) may perform one or more of the steps of process flow 700.

In some embodiments, and as shown in block 702, the process flow 700 may include the step of ingesting a data summarization in one or more additional small language models of a plurality of small language models. In such embodiments, the one or more additional small language models configured to process datafiles of file types similar to (e.g., the patterns, data elements, and/or the like analyzed by a small language model for that file type are similar to those of another small language model for another file type) a file type of a datafile associated with the data summarization may be identified and selected from a plurality of small language models for use in analyzing the data summarization. Further, the one or more additional small language models may be stored in a memory device common to both the one or more additional small language models, the data summarization, and/or a small language model that generated the data summarization.

In some embodiments, and as shown in block 704, the process flow 700 may include the step of generating an accuracy measurement for the data summarization via each small language model of the one or more additional small language models to generate accuracy measurements. In such embodiments, to generate an accuracy measurement of a data summarization, a small language model may use a combination of quantitative and qualitative methods. For example, common reference-based evaluation metrics (e.g., ROUGE and BLEU) compare the generated data summarization to previous data summarizations, human-created reference summarizations, and/or the like by measuring overlap in word sequences. The metrics may give a score based on precision, recall, and/or alignment with the original datafile. Additionally, or alternatively, semantic similarity may be measured using embedding-based models (e.g., BERT) to compare the meaning of the summary with the original text, assessing how the summary captures one or more data entries of the datafile. Further, models may evaluate content coverage and fidelity to check if the data summarization accurately represents the data of the datafile, including essential points without distortion. Additionally, or alternatively, error analysis may help identify inaccuracies including, but not limited to, misrepresentation or hallucinated content.

In some embodiments, and as shown in block 706, the process flow 700 may include the step of calculating an average accuracy using each accuracy measurement of the generated accuracy measurements. In such embodiments, to generate the average accuracy from each accuracy measurement provided by the one or more additional small language models, each accuracy measurement may be checked for comparability (e.g., by normalizing them to the same scale). Further, once each accuracy measurement is aligned, an arithmetic mean (e.g., the sum of the accuracy measurement divided by the number of the one or more additional small language models) may be computed. Additionally, or alternatively, if one or more of the one or more additional small language models are more reliable, more valuable, more alike to the small language model associated with the data summarization, and/or the like, a weighted average may be used, where each accuracy measurement is multiplied by a weight reflecting its importance or value. In some embodiments, one or more accuracy measurement may differ significantly such that a median may be more appropriate, as it is less sensitive to outliers. Additionally, or alternatively, if the accuracy measurements are skewed and/or contain extreme values, additional techniques like trimming (e.g., removing outliers) and/or robust averaging methods (e.g., mean absolute deviation) may be applied. After calculating the average accuracy, the result may be, in some embodiments, further post-processed to match the desired output format and/or scale.

In some embodiments, and as shown in block 708, the process flow 700 may include the step of comparing the average accuracy against a threshold to determine whether the data summarization is valid. In such embodiments, the step of block 708 may be performed similarly to the steps of the process flow 800 and/or the process flow 900 as shown and described herein with respect to FIG. 8 and FIG. 9, respectively.

The process flow 700 may include additional embodiments, such as any single embodiment or any combination of embodiments described herein. Although FIG. 7 shows example blocks of the process flow 700, in some embodiments, the process flow 700 may include additional blocks, fewer blocks, different blocks, or differently arranged blocks than those depicted in FIG. 7. Additionally, or alternatively, two or more of the blocks of the process flow 700 may be performed in parallel.

FIG. 8 illustrates another process flow 800 for generative AI-enhanced localized small language model data processing, in accordance with an embodiment of the invention. In some embodiments, a system (e.g., similar to one or more of the systems shown and described herein with respect to FIGS. 1A-1C) may perform one or more of the steps of process flow 800. For example, a generative AI-enhanced localized small language model data processing system (e.g., similar to the system 130 shown and described herein with respect to FIG. 1A-1C) may perform the steps of process flow 800. In some embodiments, an artificial intelligence engine (e.g., similar to the AI engine subsystem 200 as shown and described herein with respect to FIG. 2) may perform one or more of the steps of process flow 800. Additionally, or alternatively, a generative artificial intelligence engine (e.g., similar to the generative AI subsystem 300 as shown and described herein with respect to FIG. 3) may perform one or more of the steps of process flow 800.

In some embodiments, and as shown in block 802, the process flow 800 may include the step of determining, if an average accuracy is above a threshold, that a data summarization is valid. In such embodiments, one or more small language models may be configured to ingest the data summarization (e.g., similar to the step of block 702 as shown and described herein with respect to FIG. 7) to analyze the data summarization for accuracy. Further, each small language model of the one or more additional small language models may output an accuracy measurement for the data summarization, where each accuracy measurement may then be averaged together to generate the average accuracy. Additionally, or alternatively, the threshold may be predetermined based on a file type of a datafile associated with the data summarization (e.g., a file type might require a level of accuracy in a data summarization prior to outputting the data summarization). In some embodiments, if the average accuracy is above the threshold for the associated file type, the data summarization may be validated. In such embodiments, the step of block 802 may be followed by the step of block 614 as shown and described herein with respect to FIG. 6.

In some embodiments, the step of block 802 may be performed following or in conjunction with the steps of the process flow 700 as show and described herein with respect to FIG. 7.

The process flow 800 may include additional embodiments, such as any single embodiment or any combination of embodiments described herein. Although FIG. 8 shows an example block of the process flow 800, in some embodiments, the process flow 800 may include additional blocks, different blocks, or differently arranged blocks than those depicted in FIG. 8. Additionally, or alternatively, two or more of the blocks of the process flow 800 may be performed in parallel.

FIG. 9 illustrates another process flow 900 for generative AI-enhanced localized small language model data processing, in accordance with an embodiment of the invention. In some embodiments, a system (e.g., similar to one or more of the systems shown and described herein with respect to FIGS. 1A-1C) may perform one or more of the steps of process flow 900. For example, a generative AI-enhanced localized small language model data processing system (e.g., similar to the system 130 shown and described herein with respect to FIG. 1A-1C) may perform the steps of process flow 900. In some embodiments, an artificial intelligence engine (e.g., similar to the AI engine subsystem 200 as shown and described herein with respect to FIG. 2) may perform one or more of the steps of process flow 900. Additionally, or alternatively, a generative artificial intelligence engine (e.g., similar to the generative AI subsystem 300 as shown and described herein with respect to FIG. 3) may perform one or more of the steps of process flow 900.

In some embodiments, and as shown in block 902, the process flow 900 may include the step of determining, if an average accuracy is below a threshold, that a data summarization is not valid. In such embodiments, one or more small language models may be configured to ingest the data summarization (e.g., similar to the step of block 702 as shown and described herein with respect to FIG. 7) to analyze the data summarization for accuracy. Further, each small language model of the one or more additional small language models may output an accuracy measurement for the data summarization, where each accuracy measurement may then be averaged together to generate the average accuracy. Additionally, or alternatively, the threshold may be predetermined based on a file type of a datafile associated with the data summarization (e.g., a file type might require a level of accuracy in a data summarization prior to outputting the data summarization). In some embodiments, if the average accuracy is below the threshold for the associated file type, the data summarization may be determined to be not valid. In some embodiments, the step of block 902 may be performed following or in conjunction with the steps of the process flow 700 as show and described herein with respect to FIG. 7. Further, the step of block 902 may be performed following or in conjunction with the steps of the process flow 800 as shown and described herein with respect to FIG. 8.

In some embodiments, and as shown in block 904, the process flow 900 may include the step of generating, via a small language model, a new data summarization. In some embodiments, the data summarization was determined to be not valid (e.g., the average accuracy across the one or more additional small language models was below the threshold). In such embodiments, a small language model (e.g., a small language model that generated the data summarization) may be configured to generate the new data summarization (e.g., by ingesting a datafile associated with the data summarization, the output of the one or more additional small language models, and/or a combination of both) such that the new data summarization is different from the data summarization (e.g., the initial data summarization, a previously generated data summarization, and/or the like). In some embodiments, the step of block 904 may be performed similarly to the steps of block 608 and block 610 as shown and described herein with respect to FIG. 6.

The process flow 900 may include additional embodiments, such as any single embodiment or any combination of embodiments described herein. Although FIG. 9 shows example blocks of the process flow 900, in some embodiments, the process flow 900 may include additional blocks, fewer blocks, different blocks, or differently arranged blocks than those depicted in FIG. 9. Additionally, or alternatively, two or more of the blocks of the process flow 900 may be performed in parallel.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in party to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generative AI-enhanced localized small language model data processing, the system comprising:
 - a network interface configured to communicate via a communication network;
 - at least one non-transitory storage device comprising computer program code stored thereon; and
 - at least one processing device operably coupled to the network interface, and the at least one non-transitory storage device, wherein the computer program code comprises computer instructions configured to cause the processing device to:
 - receive, via the network interface, a plurality of small language models, wherein each small language model of the plurality of small language models is configured to process a file type of a plurality of file types;
 - receive a datafile comprising one or more data entries, wherein each data entry of the one or more data entries has a data type of one or more data types;
 - classify the datafile as being a file type of the plurality of file types;
 - ingest, based on classifying the datafile as being the file type, the datafile in a small language model of the plurality of small language models, wherein the small language model is configured to process the file type of the datafile;
 - generate, via the small language model, a data summarization of the one or more data entries and an adjusted datafile, wherein the adjusted datafile comprises adjusted image resolutions or clarity enhancements of the datafile;
 - ingest, based on the data summarization being generated, the data summarization in one or more additional small language models of the plurality of small language models configured to process other file types of the plurality of file types, wherein the other file types are different from the file type of the datafile;
 - generate an accuracy measurement for the data summarization via each small language model of the one or more additional small language models to generate accuracy measurements;
 - calculate an average accuracy using each accuracy measurement of the generated accuracy measurements;
 - compare the average accuracy against a threshold to determine whether the data summarization is valid; and
 - output, based on determining the data summarization is valid, the data summarization and the adjusted datafile via the network interface.

2. The system of claim 1, wherein the at least one non-transitory storage device comprises computer-executable program code that, when executed by the at least one processing device, causes the at least one processing device to, when validating the data summarization of the datafile:
 - determine, if the average accuracy is below the threshold, that the data summarization is not valid; and
 - generate, via the small language model, a new data summarization.

3. The system of claim 1, wherein the plurality of small language models are local versions of a global plurality of small language models stored on a system connected via the network interface.

4. The system of claim 3, wherein each small language model of the global plurality of small language models is trained on a database associated with a file type of each small language model.

5. The system of claim 4, wherein each database comprises a plurality of data elements required for a file type associated with the database.

6. The system of claim 1, wherein the small language model is configured to output one or more metadata elements associated with the one or more data entries of the datafile.

7. The system of claim 1, wherein the adjusted datafile further comprises, text contrasts, size adjustments, and scaling adjustments.

8. A computer program product for generative AI-enhanced localized small language model data processing, the computer program product comprising a non-transitory computer-readable medium comprising code causing an apparatus to:
 - receive, via a network interface, a plurality of small language models, wherein each small language model of the plurality of small language models is configured to process a file type of a plurality of file types;
 - receive a datafile comprising one or more data entries, wherein each data entry of the one or more data entries has a data type of one or more data types;
 - classify the datafile as being a file type of the plurality of file types;
 - ingest, based on classifying the datafile as being the file type, the datafile in a small language model of the plurality of small language models, wherein the small language model is configured to process the file type of the datafile;
 - generate, via the small language model, a data summarization of the one or more data entries and an adjusted datafile, wherein the adjusted datafile comprises adjusted image resolutions or clarity enhancements of the datafile;
 - ingest, based on the data summarization being generated, the data summarization in one or more additional small language models of the plurality of small language models configured to process other file types of the plurality of file types, wherein the other file types are different from the file type of the datafile;
 - generate an accuracy measurement for the data summarization via each small language model of the one or more additional small language models to generate accuracy measurements;
 - calculate an average accuracy using each accuracy measurement of the generated accuracy measurements;
 - compare the average accuracy against a threshold to determine whether the data summarization is valid; and
 - output, based on determining the data summarization is valid, the data summarization and the adjusted datafile via the network interface.

9. The computer program product of claim 8, wherein the non-transitory computer-readable medium comprises code causing an apparatus to, when validating the data summarization of the datafile:

determine, if the average accuracy is below the threshold, that the data summarization is not valid; and generate, via the small language model, a new data summarization.

10. The computer program product of claim 8, wherein the plurality of small language models are local versions of a global plurality of small language models stored on a system connected via the network interface.

11. The computer program product of claim 10, wherein each small language model of the global plurality of small language models is trained on a database associated with a file type of each small language model.

12. The computer program product of claim 11, wherein each database comprises a plurality of data elements required for a file type associated with the database.

13. The computer program product of claim 8, wherein the small language model is configured to output one or more metadata elements associated with the one or more data entries of the datafile.

14. The computer program product of claim 8, wherein the adjusted datafile further comprises, text contrasts, size adjustments, and scaling adjustments.

15. A computer-implemented method for generative AI-enhanced localized small language model data processing, the method comprising:

receiving, via a network interface, a plurality of small language models, wherein each small language model of the plurality of small language models is configured to process a file type of a plurality of file types;

receiving a datafile comprising one or more data entries, wherein each data entry of the one or more data entries has a data type of one or more data types;

classifying the datafile as being a file type of the plurality of file types;

ingesting, based on classifying the datafile as being the file type, the datafile in a small language model of the plurality of small language models, wherein the small language model is configured to process the file type of the datafile;

generating, via the small language model, a data summarization of the one or more data entries and an adjusted datafile, wherein the adjusted datafile comprises adjusted image resolutions or clarity enhancements of the datafile;

ingesting, based on the data summarization being generated, the data summarization in one or more additional small language models of the plurality of small language models configured to process other file types of the plurality of file types, wherein the other file types are different from the file type of the datafile;

generating an accuracy measurement for the data summarization via each small language model of the one or more additional small language models to generate accuracy measurements;

calculating an average accuracy using each accuracy measurement of the generated accuracy measurements;

comparing the average accuracy against a threshold to determine whether the data summarization is valid; and outputting, based on determining the data summarization is valid, the data summarization and the adjusted datafile via the network interface.

* * * * *